(12) United States Patent
Kim et al.

(10) Patent No.: US 10,531,123 B2
(45) Date of Patent: Jan. 7, 2020

(54) IMAGE ENCODING AND DECODING METHOD BASED ON LOW-COMPLEXITY TRANSFORMATION, AND APPARATUS USING SAME

(71) Applicant: KOREA ADVANCED INSTITUTE OF SCIENCE AND TECHNOLOGY, Daejeon (KR)

(72) Inventors: Mun Churl Kim, Daejeon (KR); Bum Shik Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 15/556,212

(22) PCT Filed: Dec. 21, 2015

(86) PCT No.: PCT/KR2015/014045
§ 371 (c)(1),
(2) Date: Sep. 6, 2017

(87) PCT Pub. No.: WO2016/143991
PCT Pub. Date: Sep. 15, 2016

(65) Prior Publication Data
US 2018/0041776 A1     Feb. 8, 2018

(30) Foreign Application Priority Data

Mar. 6, 2015 (KR) .................. 10-2015-0031851

(51) Int. Cl.
*H04N 19/61* (2014.01)
*H04N 19/176* (2014.01)
(Continued)

(52) U.S. Cl.
CPC .......... *H04N 19/61* (2014.11); *H04N 19/122* (2014.11); *H04N 19/157* (2014.11);
(Continued)

(58) Field of Classification Search
CPC .... H04N 19/61; H04N 19/194; H04N 19/157; H04N 19/18; H04N 19/42; H04N 19/159;
(Continued)

(56) References Cited

U.S. PATENT DOCUMENTS 5,768,434 A * 6/1998 Ran ...................... H04N 11/042
375/E7.136
8,437,564 B2   5/2013 Harmanci et al.
(Continued)

OTHER PUBLICATIONS

Lee et al., A fast hybrid Jacket—Hadamard matrix based diagonal block-wise transform, Jan. 2014, Signal Processing: Image Communication, vol. 29, Issue 1, Jan. 2014, pp. 49-65 (Year: 2014).*
(Continued)

*Primary Examiner* — James M Pontius
(74) *Attorney, Agent, or Firm* — NSIP Law

(57) ABSTRACT

An image decoding method based on a low-complexity transformation is provided. The method comprises: executing a transformation with respect to a residual block based on a first transformation kernel, and executing a transformation with respect to the transformed residual block based on a second transformation kernel having low-complexity, wherein the first transformation kernel is derived based on a prediction block or an encoding unit block.

19 Claims, 17 Drawing Sheets

(51) Int. Cl.
    *H04N 19/625*     (2014.01)
    *H04N 19/42*     (2014.01)
    *H04N 19/18*     (2014.01)
    *H04N 19/157*     (2014.01)
    *H04N 19/194*     (2014.01)
    *H04N 19/122*     (2014.01)
    *H04N 19/159*     (2014.01)

(52) U.S. Cl.
    CPC ......... *H04N 19/159* (2014.11); *H04N 19/176* (2014.11); *H04N 19/18* (2014.11); *H04N 19/194* (2014.11); *H04N 19/42* (2014.11); *H04N 19/625* (2014.11)

(58) Field of Classification Search
    CPC ... H04N 19/122; H04N 19/625; H04N 19/176
    See application file for complete search history.

(56) References Cited

U.S. PATENT DOCUMENTS

| | | | |
|---|---|---|---|
| 8,687,692 B2 | 4/2014 | Park et al. | |
| 2005/0013369 A1* | 1/2005 | Lee | H04N 19/56 375/240.16 |
| 2005/0069035 A1* | 3/2005 | Lu | G06F 17/147 375/240.2 |
| 2006/0029282 A1* | 2/2006 | Meeker | H04N 19/63 382/250 |
| 2008/0152005 A1* | 6/2008 | Oguz | H04N 19/176 375/240.12 |
| 2011/0158315 A1 | 6/2011 | Kim et al. | |
| 2011/0276612 A1* | 11/2011 | Droz | G06K 9/6249 708/203 |
| 2012/0082211 A1 | 4/2012 | Budagavi et al. | |
| 2013/0101048 A1* | 4/2013 | Lee | G06F 17/14 375/240.19 |
| 2013/0235939 A1 | 9/2013 | Kumar et al. | |
| 2014/0064361 A1* | 3/2014 | Karczewicz | H04N 19/30 375/240.03 |
| 2014/0211039 A1* | 7/2014 | Herman | G06T 9/00 348/222.1 |
| 2015/0264403 A1* | 9/2015 | Chong | H04N 19/61 375/240.18 |
| 2017/0195671 A1* | 7/2017 | Choi | H04N 19/119 |

OTHER PUBLICATIONS

International Search Report issued in counterpart International Application No. PCT/KR2015/014045 dated Apr. 25, 2016 (2 pages in English: 2 pages in Korean).

* cited by examiner

IMAGE ENCODING AND DECODING METHOD BASED ON LOW-COMPLEXITY TRANSFORMATION, AND APPARATUS USING SAME

CROSS-REFERENCE TO RELATED APPLICATIONS

This application is the National Stage filing under 35 U.S.C. 371 of International Application No. PCT/KR2015/014045, filed on Dec. 21, 2015, which claims the benefit of Korea Application No. 10-2015-0031851 filed on Mar. 6, 2015, the contents of which are all hereby incorporated by reference herein in their entirety.

BACKGROUND OF THE INVENTION

Field of the Invention

The present invention relates to a video encoding/decoding method and apparatus using the same and, more particularly, to a video encoding/decoding method using a low-complexity transform kernel in video encoding/decoding and an apparatus using the same.

Related Art

The continuous development of the information communication industry has led to the global spread of broadcast services having high definition (HD) resolution. Accordingly, many users have become accustomed to videos of high resolution and high picture quality. In order to satisfy the needs of users for high picture quality, many institutes are accelerating the development of a next-generation video apparatus. Furthermore, as there is a growing interest in ultra high definition (UHD) having resolution four times or more of full HD (FHD) and HDTV in addition to HDTV, there is a need for a video encoding/decoding technology for an image of higher resolution and high picture quality.

In the video encoding/decoding apparatus and method, in order to perform the encoding/decoding of video having higher resolution and high picture quality, an inter-prediction technology for predicting a pixel value included in a current picture from a temporally previous and/or subsequent picture, an intra-prediction technology for predicting a pixel value included in a current picture using pixel information within the current picture, and an entropy encoding technology for assigning a short symbol to a symbol having high appearance frequency and assigning a long symbol to a symbol having low appearance frequency may be used.

SUMMARY OF THE INVENTION

An object of the present invention is to provide a method of encoding and/or decoding video by applying a transform kernel (or block) having low complexity when the video is transformed and an apparatus using the same.

Furthermore, an object of the present invention is to provide a method of encoding and/or decoding video, which reduces the complexity of a transform process by using the results of low-complexity transform application obtained in a motion prediction process as the results of first transform and using only second transform to which a sparse transform kernel (or block) having low complexity is applied when video is transform-encoded, and an apparatus using the same.

Furthermore, an object of the present invention is to provide a method of encoding and/or decoding video by applying a Walsh-Hadamard transform kernel (or block) before a sparse transform kernel (or block), that is, a secondary transform kernel having low complexity, is applied in order to reduce transform complexity, and an apparatus using the same.

Furthermore, an object of the present invention is to provide a method of encoding and/or decoding video by applying a 2-square transform kernel (or block) before a sparse transform kernel (or block), that is, a secondary transform kernel having low complexity, is applied in order to reduce transform complexity, and an apparatus using the same.

In accordance with an embodiment of the present invention, there is provided a video decoding method based on low-complexity transform, including the steps of performing transform on a residual block based on a first transform kernel and performing transform the transformed residual block based on a second transform kernel having low complexity, wherein the first transform kernel has been derived based on a prediction block or an encoding unit block.

In this case, the prediction block may include at least one first transform kernel.

In this case, the prediction block may be a square or a non-square.

In this case, the first transform kernel included in the prediction block may be a square or a non-square.

In this case, the prediction block may have a 3N×4N size, and the prediction block may include two first transform kernels of a 2N×2N size and four first transform kernels having an N×N size.

In this case, the second transform kernel may have the same size as the first transform kernel.

In this case, the transform to which both the first transform kernel and the second transform kernel have been applied may be transform corresponding to discrete cosine transform.

In this case, the first transform kernel may be a Walsh-Hadamard transform kernel, and the second transform kernel may be a sparse matrix.

In this case, the transform based on the Walsh-Hadamard transform kernel and the sparse matrix may be defined as in an equation below.

$$C_M = \frac{1}{\sqrt{M}} A_M H_{w,M},$$

The $C_M$ may correspond to DCT transform, the M may be the size of the transform kernel, the $A_M$ may be the sparse matrix, and the $H_{w,M}$ may be the Walsh-Hadamard transform kernel.

In this case, the first transform kernel may be a 2-square transform kernel, and the second transform kernel may be a sparse matrix.

In this case, the transform based on the 2-square transform kernel and the sparse matrix may be defined as in an equation below.

$$C_M = \frac{1}{\sqrt{M}} A_M T_{2-p,M},$$

The $C_M$ may correspond to DCT transform, the M may be the size of the transform kernel, the $A_M$ may be the sparse matrix, and the $T_{2\text{-}p,M}$ may be the 2-square transform kernel.

In accordance with another embodiment of the present invention, there may be provided a video encoding method based on low-complexity transform, including the steps of performing transform on a residual block based on a first transform kernel and performing transform on the transformed residual block based on a second transform kernel having low complexity, wherein the first transform kernel has been derived based on a prediction block or an encoding unit block.

In accordance with another embodiment of the present invention, there may be provided a video encoding method based on low-complexity transform, including the steps of performing transform on a residual block based on a first transform kernel and performing transform on the transformed residual block based on a second transform kernel having low complexity, wherein the first transform kernel has been derived based on an encoding unit block.

In accordance with yet another embodiment of the present invention, there may be provided a video decoder based on low-complexity transform, including a first transform kernel application unit transforming a residual block based on a first transform kernel and an inverse transform unit transforming the transformed residual block based on a second transform kernel having low complexity, wherein the first transform kernel has been derived based on a prediction block or an encoding unit block.

In accordance with yet another embodiment of the present invention, there may be provided a video encoder based on low-complexity transform, including a first transform kernel application unit transforming a residual block based on a first transform kernel and a transform unit transforming the transformed residual block based on a second transform kernel having low complexity, wherein the first transform kernel has been derived based on a prediction block or an encoding unit block.

In accordance with the present invention, encoding and/or decoding efficiency of video is improved if a transform kernel (or block) having low complexity is applied when the video is transformed.

In accordance with the present invention, encoding and/or decoding efficiency of video is improved by applying a Walsh-Hadamard transform kernel (or block) before a sparse transform kernel (or block), that is, a secondary transform kernel having low complexity, is applied in order to reduce transform complexity when the video is transformed.

Furthermore, in the present invention, encoding and/or decoding efficiency of video is improved by applying a 2-square transform kernel (or block) before a sparse kernel (or block), that is, a secondary transform kernel having low complexity, is applied in order to reduce transform complexity when the video is transformed.

DESCRIPTION OF EXEMPLARY EMBODIMENTS

Hereinafter, embodiments of the present invention are described in detail with reference to the accompanying drawings. In describing the embodiments of this specification, a detailed description of the known functions and constructions will be omitted if it is deemed to make the gist of this specification unnecessarily vague.

Figure 1:
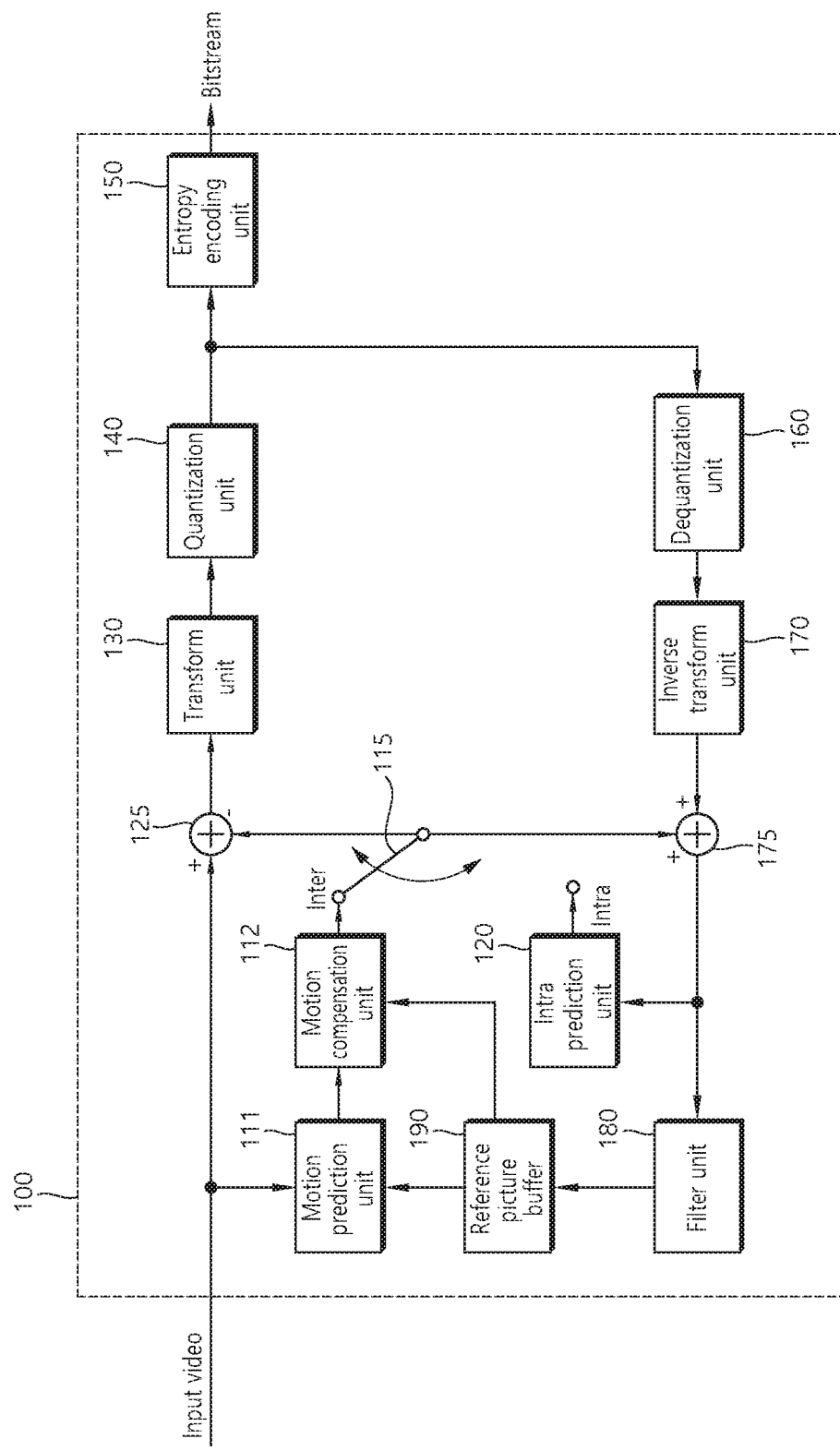
FIG. 1 is a block diagram showing a configuration according to an embodiment of a video encoder to which the present invention is applied.

FIG. 1 is a block diagram showing a configuration according to an embodiment of a video encoder to which the present invention is applied.

Referring to FIG. 1, the video encoder 100 includes a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180 and a reference picture buffer 190.

The video encoder 100 may perform encoding on input video in an intra-mode or an inter-mode and output a bitstream. In the case of the intra-mode, the switch 115 may switch to intra. In the case of the inter-mode, the switch 115 may switch to inter. The video encoder 100 may encode the residual of an input block and prediction block after generating the prediction block for the input block of the input video.

In the case of the intra-mode, the intra-prediction unit 120 may use a pixel value of an already encoded block that neighbors a current block as a reference pixel. The intra-prediction unit 120 may perform spatial prediction on using the reference pixel and generate prediction samples for the current block.

In the case of the inter-mode, the motion prediction unit 111 may calculate a motion vector by searching reference video, stored in the reference picture buffer 190 in a motion prediction process, for a region most matched with an input block.

The motion compensation unit 112 may generate a prediction block by performing motion compensation using a motion vector. In this case, the motion vector is a two-dimensional vector used for inter-prediction, and may indicate an offset between video to be now encoded/decoded and reference video.

The subtractor 125 may generate a residual block (residual signal) based on the difference between an input block and a generated prediction block.

The transform unit 130 may output a transform coefficient by performing transform on a residual block. In this case, the transform coefficient may mean a coefficient value generated by performing transform on the residual block and/or residual signal. If a transform skip mode is applied, the transform unit 130 may skip transform for the residual block.

Hereinafter, in this specification, a quantized transform coefficient level generated by applying quantization to a transform coefficient may also be called a transform coefficient.

The quantization unit 140 may output a quantized transform coefficient level by quantizing a received transform coefficient based on a quantization parameter. In this case, the quantization unit 140 may quantize the received transform coefficient using a quantization matrix.

The entropy encoding unit 150 may output a bitstream by entropy-encoding values calculated by the quantization unit 140 or an encoding parameter value calculated in an encoding process according to a probability distribution. The entropy encoding unit 150 may also entropy-encode information (e.g., a syntax element) for video decoding in addition to pixel information of video.

The encoding parameter is information necessary for encoding and decoding, and may include information that may be inferred in an encoding or decoding process in addition to information that is encoded by the encoding apparatus and transferred to a decoding apparatus, like a syntax element.

The encoding parameter may include values or statistics, such as an intra-/inter-prediction mode, a motion/motion vector, a reference video index, an encoding block pattern, the presence of a residual signal or not, a transform coefficient, a quantized transform coefficient, a quantization parameter, a block size, and block partition information.

The residual signal may mean a difference between the original signal and a prediction signal. Furthermore, the residual signal may also mean a signal of a form in which a difference between the original signal and a prediction signal has been transformed, or a signal of a form in which a difference between the original signal and a prediction signal has been transformed and quantized. The residual signal may also be called a residual block in a block unit.

If entropy encoding is applied, a small number of bits are assigned to a symbol having a high occurrence probability and a large number of bits are assigned to a symbol having a low occurrence probability, thereby representing the symbols. Accordingly, the size of a bit string for symbols to be encoded can be reduced. Accordingly, compression performance of video encoding can be improved through entropy encoding.

For entropy encoding, an encoding method, such as exponential Golomb, context-adaptive variable length coding (CAVLC) or context-adaptive binary arithmetic coding (CABAC), may be used. For example, the entropy encoding unit 150 may perform entropy encoding using a variable length coding/code (VLC) table. Furthermore, the entropy encoding unit 150 may derive the binarizaiton method of a target symbol and the probability model of a target symbol/bin, and perform entropy encoding using the derived binarization method or probability model.

The quantized coefficient may be dequantized by the dequantization unit 160 and may be inverse transformed by the inverse transform unit 170. The dequantized and inverse transformed coefficient may be added to a prediction block through the adder 175, so a reconstruction block may be generated.

The reconstruction block experiences the filter unit 180. The filter unit 180 may apply one or more of a deblocking filter, a sample adaptive offset (SAO) and an adaptive loop filter (ALF) to a reconstruction block or reconstruction picture. The filter unit 180 may also be called an adaptive in-loop filter.

The deblocking filter can remove block distortion generated at the boundary of blocks. The SAO may add a proper offset value to a pixel value in order to compensate for a coding error. The ALF may perform filtering based on a value obtained by comparing reconstructed video with the original video. A reconstruction block that has experienced the filter unit 180 may be stored in the reference picture buffer 190.

Figure 2:
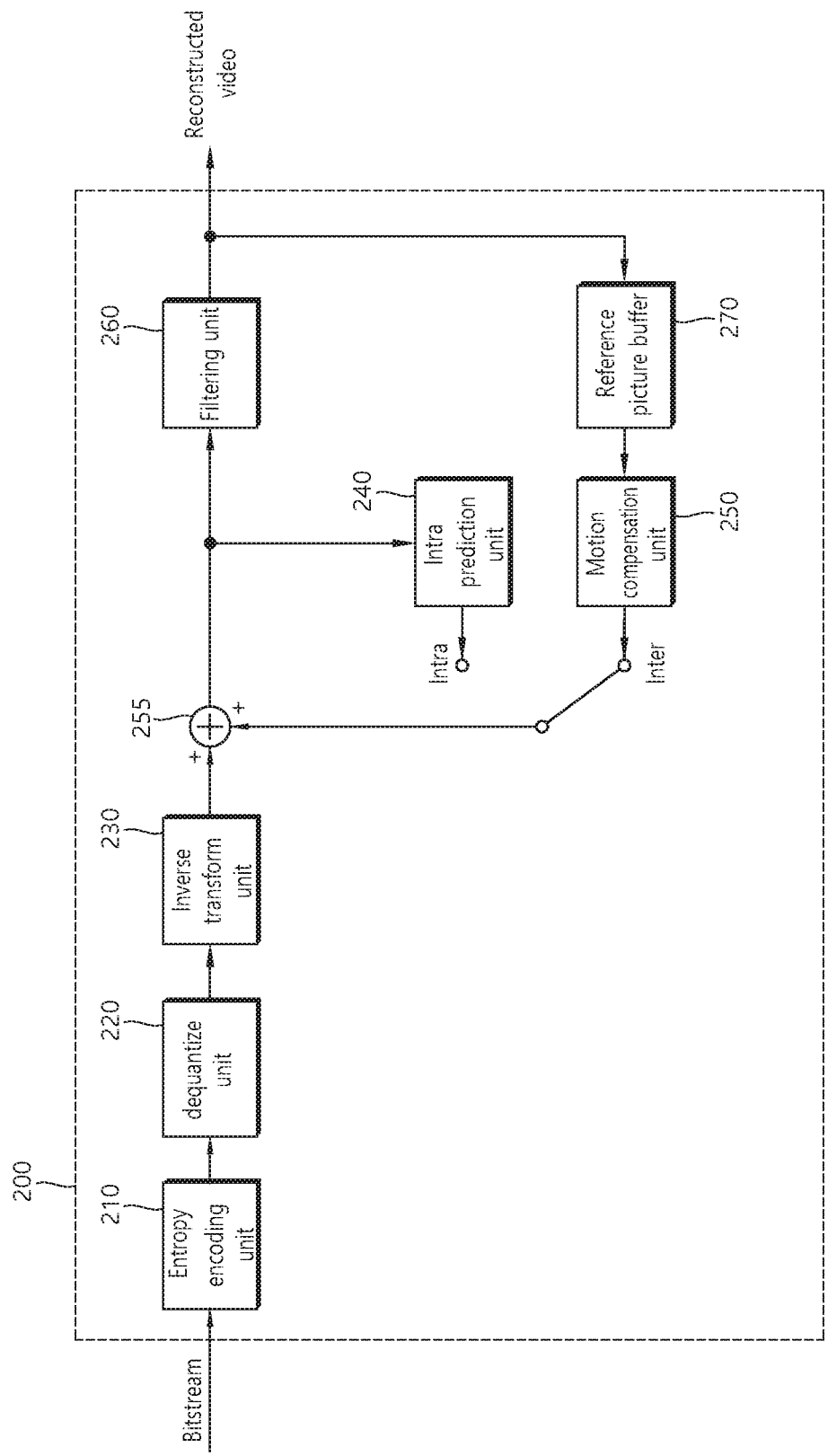
FIG. 2 is a block diagram showing a configuration according to an embodiment of a video decoder to which the present invention is applied.

FIG. 2 is a block diagram showing a configuration according to an embodiment of a video decoder to which the present invention is applied.

Referring to FIG. 2, the video decoder 200 includes an entropy decoding unit 210, a dequantization unit 220, an inverse transform unit 230, an intra-prediction unit 240, a motion compensation unit 250, an adder 255, a filter unit 260 and a reference picture buffer 270.

The video decoder 200 may receive a bitstream output by the encoder, may perform decoding the received bitstream in the intra-mode or the inter-mode, and may output reconstructed video, that is, reconstruction video. In the case of the intra-mode, a switch may switch to intra. In the case of the inter-mode, the switch may switch to inter. The video decoder 200 may obtain a reconstructed residual block from the received bitstream, may generate a prediction block, and may generate a reconstructed block, that is, a reconstruction block, by adding the reconstructed residual block and the prediction block together.

The entropy decoding unit 210 may generate symbols including a symbol of a quantized coefficient form by entropy-decoding a received bitstream according to a probability distribution. The entropy decoding method is performed as the inverse process of the aforementioned entropy encoding method.

The quantized coefficient is dequantized by the dequantization unit 220 and inverse transformed by the inverse transform unit 230. As the results of the dequantization/inverse transform of the quantized coefficient, a reconstructed residual block may be generated. In this case, the dequantization unit 220 may apply a quantization matrix to the quantized coefficient.

In the case of the intra-mode, the intra-prediction unit 240 may generate a prediction block by performing spatial prediction using the pixel value of an already encoded block that neighbors a current block. In the case of the inter-mode, the motion compensation unit 250 may generate a prediction block by performing motion compensation using a motion vector and reference video stored in the reference picture buffer 270.

A reconstructed residual block and a prediction block are added together through the adder 255, and the added block may experience the filter unit 260. The filter unit 260 may apply at least one of the deblocking filter, the SAO and the ALF to a reconstruction block or a reconstruction picture. The filter unit 260 may output reconstructed video, that is, the reconstruction video. The reconstructed video may be stored in the reference picture buffer 270 and used for inter-prediction.

Figure 3:
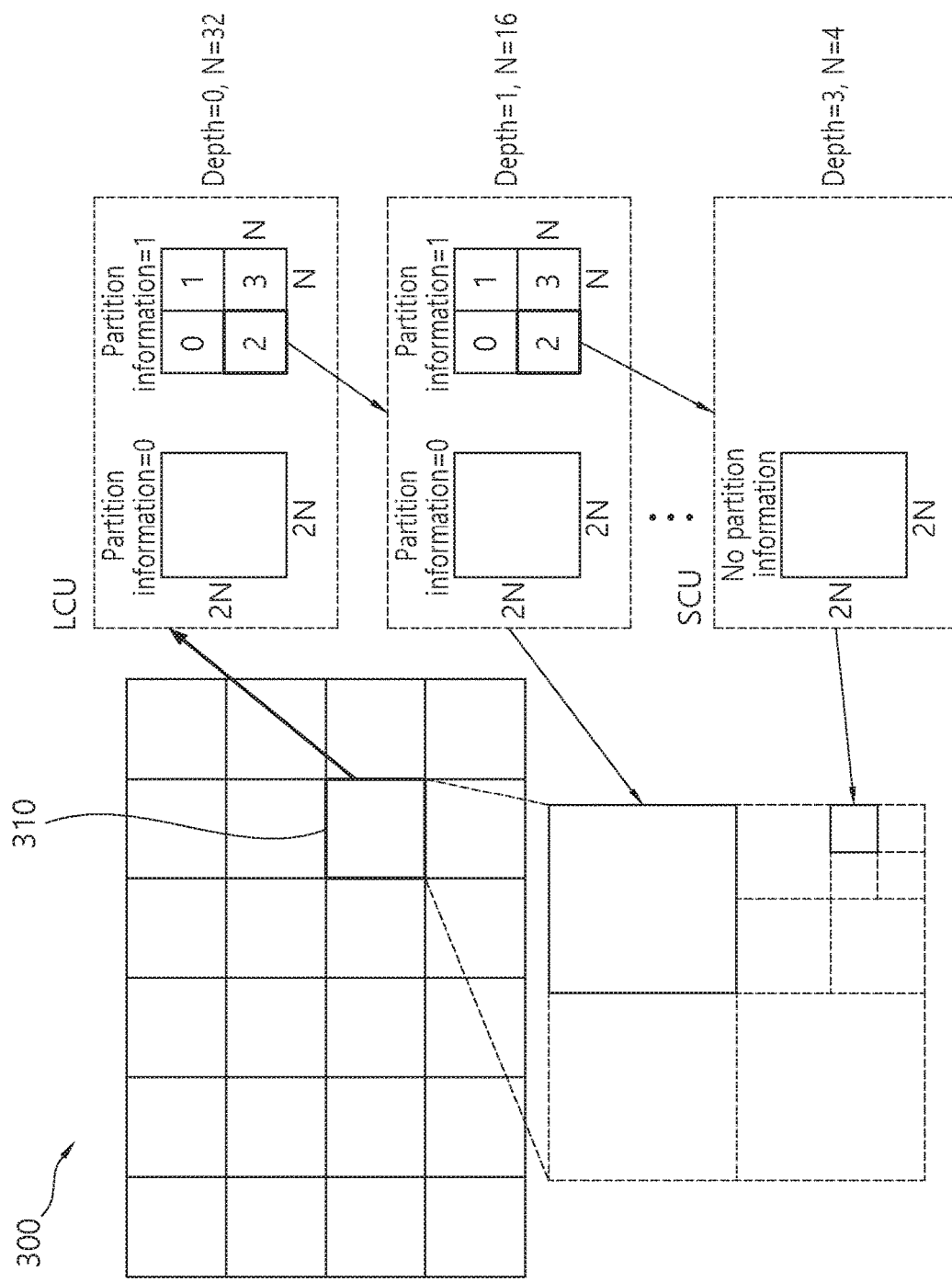
FIG. 3 is a diagram schematically showing the partition structure of video when the video is encoded or decoded.

FIG. 3 is a diagram schematically showing the partition structure of video when the video is encoded or decoded.

In order to efficiently partition video, encoding and decoding may be perform in a coding unit (CU). The unit collectively refers to a block including a syntax element and video symbols. The partition of video may mean that a block corresponding to a unit is partitioned.

Referring to FIG. 3, after a video 300 is sequentially partition in the largest coding unit (LCU) (hereinafter referred to as an LCU) unit, a partition structure is determined in the LCU unit. In this case, the LCU may be used as the same meaning as a coding tree unit (CTU). The partition structure means a distribution of coding units (hereinafter CUs) for efficiently encoding video within an LCU 310. The distribution may be determined depending on whether one CU will be partition into four CUs each reduced by half in its horizontal size and vertical size. The partitioned CU may be recursively partition into four CUs each reduced by half in its horizontal size and vertical size in the same manner.

In this case, the partition of the CU may be recursively partitioned up to a predefined depth. Depth information is information indicative of the size of a CU and stored every CU. For example, the depth of the LCU may be 0, and the depth of the smallest coding unit (SCU) may be a predefined greatest depth. In this case, as described above, the LCU is a CU having the largest CU size, and the SCU is a CU having the smallest CU size.

Whenever partition is performed from the LCU 310 by half in its horizontal size and vertical size, the depth of the CU is increased by 1. A CU that has not been partitioned for each depth has a 2N×2N size. A CU that has been partitioned has for each depth is partition into four CUs having an N×N size in the CU of the 2N×2N size. The size of N is reduced by half whenever the depth is increased by 1.

Referring to FIG. 3, the size of an LCU having the smallest depth of 0 may be 64×64 pixels. The size of an SCU having the greatest depth of 3 may be 8×8 pixels. In this case, the CU (LCU) of the 64×64 pixels may be expressed as a depth 0, the CU of 32×32 pixels may be expressed as a depth 1, the CU of 16×16 pixels may be expressed as a depth 2, and the CU (SCU) of the 8×8 pixels may be expressed as a depth a depth 3.

Furthermore, information about whether a specific CU will be partitioned may be expressed through 1-bit partition information for each CU. The partition information may be included in all of CUs other than the SCU. For example, if a CU is not partitioned, 0 may be stored in the partition information. If a CU is partitioned, 1 may be stored in the partition information.

Figure 4:
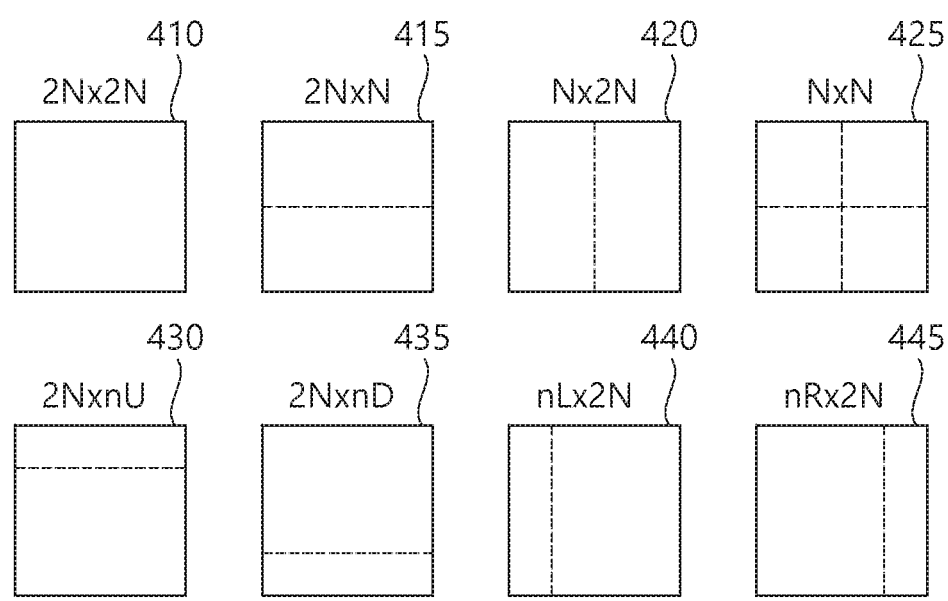
FIG. 4 is a diagram showing forms of a prediction unit (PU) which may be included in a coding unit (CU).

FIG. 4 is a diagram showing forms of a prediction unit (PU) which may be included in a coding unit (CU).

A CU that belongs to CUs partitioned from an LCU and that is no longer partitioned is partition into one or more prediction units, and a behavior thereof itself is referred to as a partition.

A prediction unit (hereinafter referred to as a PU) is a basic unit on which prediction is performed, and is encoded and decoded based on any one of a skip mode, an inter-mode and an intra-mode. The PU may be partitioned in various forms depending on each mode.

Referring to FIG. 4, in the case of the skip mode, a 2N×2N mode 410 having the same size as a CU can be supported without a partition within the CU.

In the case of the inter-mode, eight types of partitioned forms, for example, a 2N×2N mode 410, a 2N×N mode 415, an N×2N mode 420, an N×N mode 425, a 2N×nU mode 430, a 2N×nD mode 435, an nL×2N mode 440 and an nR×2N mode 445 can be supported within a CU.

In the case of the intra-mode, the 2N×2N mode 410 and the N×N mode 425 can be supported within a CU.

Figure 5:
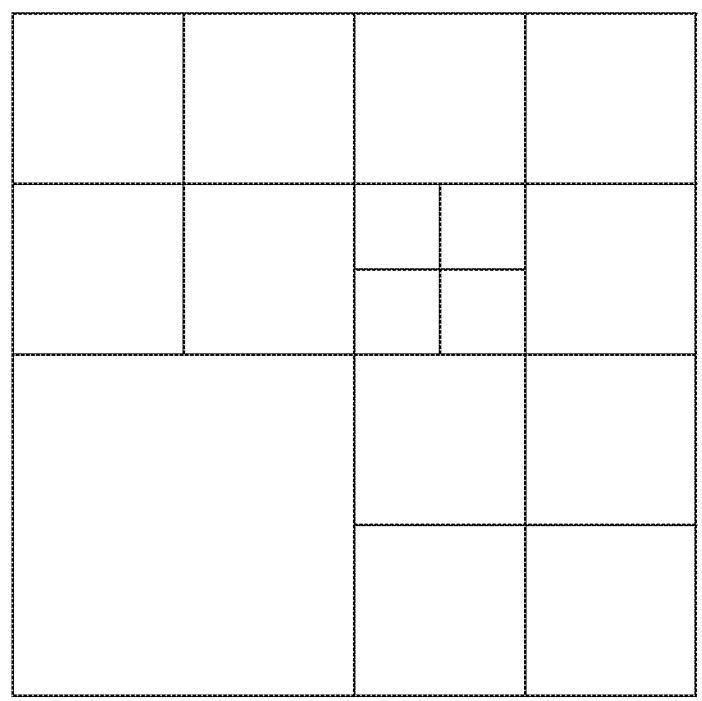
FIG. 5 is a diagram showing a form of transform units (TU) which may be included in a coding unit (CU).

FIG. 5 is a diagram showing a form of transform units (TUs) which may be included in a coding unit (CU).

A transform unit (hereinafter called a TU) is a basic unit used for a transform, quantization, inverse transform and dequantization process within a CU. A TU may have a square type or rectangular form. A CU that belongs to CUs partitioned from an LCU and that is no longer partitioned may be partitioned into one or more TUs. In this case, the partition structure of the TU may be a quad-tree structure. For example, as shown in FIG. 5, one CU 510 may be partitioned once or more according to a quad-tree structure to form TUs of various sizes.

Figure 6:
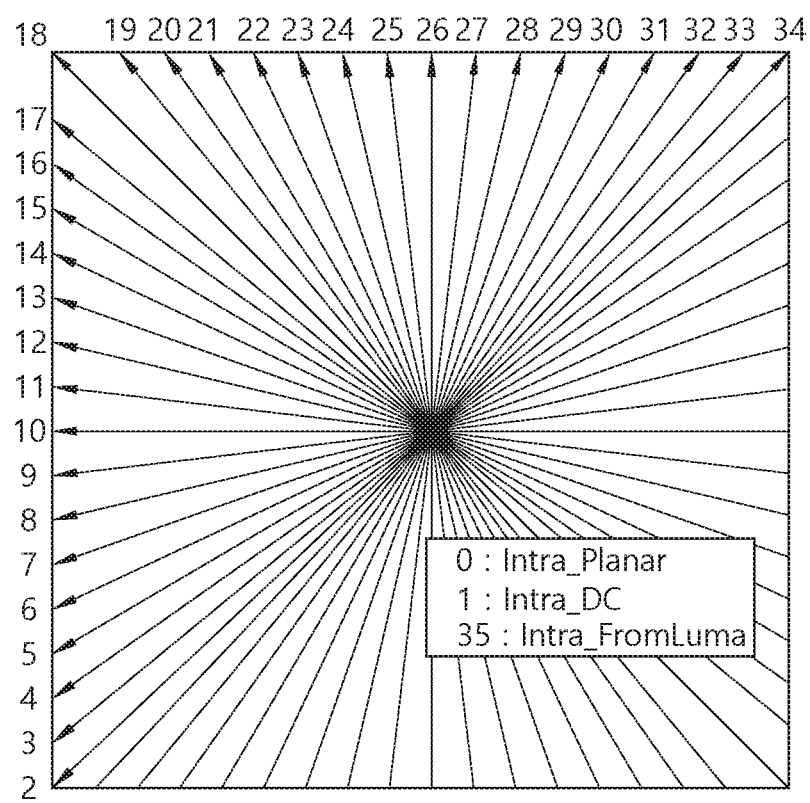
FIG. 6 is a diagram for illustrating an embodiment of an intra-prediction process.

FIG. 6 is a diagram for illustrating an embodiment of an intra-prediction process.

The number of intra-prediction modes may be fixed to 35 regardless of the size of a prediction unit. In this case, a prediction mode may include two planar modes (DC, Planar) and 33 directivity modes as in FIG. 6. In this case, the number of prediction modes may be different depending on whether a color component is a luma signal or a chroma signal. The size of a prediction unit may be a square of an N×N form, such as 4×4, 8×8, 16×16, 32×32 or 64×64, or an 2N×2N form. The unit of a prediction unit may be at least one size of a coding unit (CU), a prediction unit (PU) and a transform unit (TU). Intra-encoding/decoding may be performed using a sample value included in a neighbor reconstructed unit or an encoding parameter.

Figure 7:
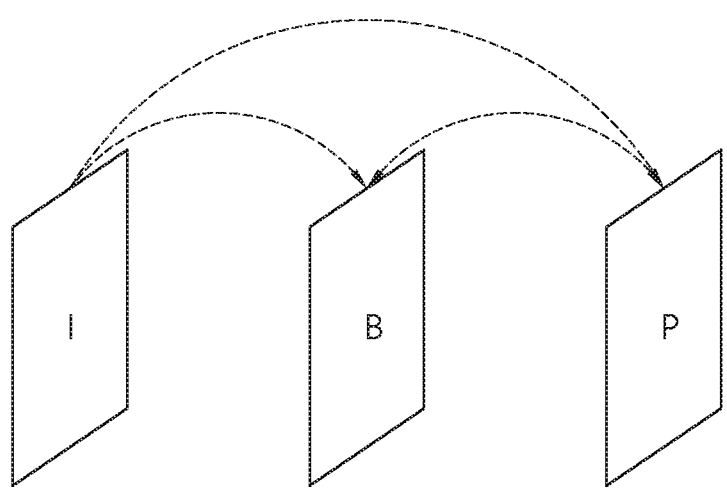
FIG. 7 is a diagram for illustrating an embodiment of an inter-prediction process.

FIG. 7 is a diagram for illustrating an embodiment of an inter-prediction process.

A quadrangle shown in FIG. 7 shows a video picture. Furthermore, an arrow in FIG. 7 indicates a prediction direction. That is, video may be encoded/decoded in the prediction direction.

Each video picture is divided into an intra picture (I picture), a uni-prediction picture (P picture) and a bi-prediction picture (B picture) depending on an encoding type and may be encoded depending on the encoding type of a picture.

In the I picture, an image itself is encoded without prediction between pictures. In the P picture, inter-picture prediction encoding is performed using a reference picture only in the forward direction. In the B picture, inter-picture prediction encoding is performed using a reference picture in the forward and backward directions or inter-picture prediction encoding is performed using a reference picture in one of the forward and backward directions.

In this case, the P picture and B picture using reference video may be called inter-prediction.

Hereinafter, inter-prediction is described in detail.

Inter-prediction may be performed through a reference picture and motion information. Furthermore, inter-prediction may use the aforementioned skip mode.

A reference picture may be at least one of pictures prior to or posterior to a current picture. In this case, inter-prediction may be performed on a block based on the reference picture. That is, the reference picture may mean video used for the prediction of the block.

In this case, a region within the reference picture may be indicated using a reference picture index (refIdx) indicative of the reference picture, a motion vector to be described later, etc. In inter-prediction, a reference picture and a reference block corresponding to a current block within the reference picture may be selected, and a prediction block for the current block may be generated.

Motion information may be derived through the encoder and the decoder in inter-prediction. Furthermore, the derived motion information may be used to perform inter-prediction.

In this case, the encoder and the decoder can improve encoding/decoding efficiency using motion information of a reconstructed neighboring block and/or a collocated block corresponding to a current block within an already reconstructed collocated picture. In this case, the reconstructed neighboring block is a block within a current picture that has been already encoded and/or decoded and reconstructed, and may include a block neighboring a current block and/or a block located at the outer corner of the current block.

Furthermore, the encoder and the decoder may determine a specific relative location based on a block that is present at a location spatially corresponding to a current block within a collocated picture, and may derive the collocated block based on the determined specific relative location (an inside and/or outside location of the block that is present at the location spatially corresponding to the current block). In this case, the collocated picture may correspond to one of reference pictures included in a reference picture list.

Meanwhile, a method of deriving motion information may be different depending on a prediction mode of a current block. A prediction mode applied for inter-prediction may include a advanced motion vector predictor (AMVP), merger, etc.

For example, if the AMVP is applied, the encoder and the decoder may generate a prediction motion vector candidate list using the motion vector of a reconstructed neighboring block and/or the motion vector of a collocated block. That is, the motion vector of the reconstructed neighboring block and/or the motion vector of the collocated block may be used as prediction motion vector candidates.

In this case, the encoder and the decoder may transmit a prediction motion vector index indicative of the best prediction motion vector, selected from prediction motion vector candidates included in the list, to the decoder. In this case, the decoder may select the prediction motion vector of a current block from the prediction motion vector candidates included in the prediction motion vector candidate list using the prediction motion vector index.

In this case, the encoder may calculate a motion vector difference (MVD) between the motion vector of a current block and a prediction motion vector, may encode the MVD, and may transmit the encoded MVD to the decoder. In this case, the decoder may decode the received MVD, and may derive the motion vector of the current block through the sum of the decoded motion vector difference and the prediction motion vector.

In this case, the encoder may also transmit a reference picture index indicative of a reference picture to the decoder. The decoder may predict the motion vector of the current block using motion information of neighboring blocks, etc. and may derive the motion vector of the current block using the motion vector difference received from the encoder. The decoder may generate a prediction block for the current block based on the derived motion vector and the reference picture index information received from the encoder.

As another example of a method of deriving motion information, a merge motion may be applied. In this case, the merge motion may mean merge. If merge is applied, the encoder and the decoder may generate a merge motion candidate list (a merge candidate list) using motion information of a reconstructed neighboring block and/or motion information of a collocated block. In this case, motion information includes at least one of a motion vector, the index of reference video, and a prediction direction (single direction, bi-direction, etc.).

In this case, the merge motion may be applied in a CU or prediction unit (PU) unit. If the merge motion is performed in the CU or PU unit, it is necessary to transmit information regarding whether the merge motion will be performed for each block partition and information regarding that which one of neighboring blocks (a block neighboring the left of a current block, a block neighboring the top of the current block, and a block temporally neighboring the current block) that neighbors a current block will be subjected to the merge motion.

In this case, the merge motion candidate list indicates a list in which pieces of motion information are stored, and is generated before the merge motion is performed. In this case, the motion information stored in the merge motion candidate list may be motion information of a neighboring block that neighbors a current block or motion information of a collocated block of a current block in reference video. Furthermore, the motion information stored in the merge motion candidate list may be new motion information generated by combining pieces of motion information included in the merge motion candidate list.

The skip mode is one of modes used for inter-prediction because information of a neighboring block is used in a current block without any change. In the case of the skip mode, the encoder transmits only information regarding that motion information of which block will be used as motion information of a current block to the decoder. The encoder does not transmit other information (e.g., syntax information, such as motion vector difference information) to the decoder.

Figure 8:
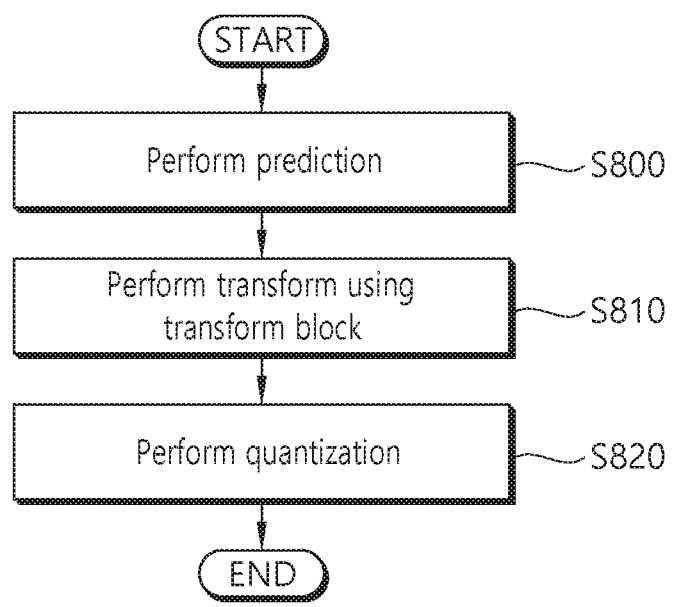
FIG. 8 is a flowchart of a video encoding method.

FIG. 8 is a flowchart of a video encoding method.

Referring to FIG. 8, the video encoder performs prediction on video (S800). When the video encoder performs prediction on the video, it may use a prediction block. The prediction block may correspond to the aforementioned prediction unit (PU). In this case, detailed contents of the prediction block and video prediction are the same as those described above.

The video encoder may perform transform using a transform kernel (S810). More specifically, the video encoder may output a transform coefficient by performing transform in such a way as to apply the transform kernel to an input block and a residual block generated from a prediction block. In this case, the residual block may be called the aforementioned residual block, residual signal or remaining signal. Accordingly, hereinafter, for convenience of description, a residual block, a residual signal, a remaining signal and a residual block may be interchangeably used. Furthermore, the transform kernel may also be called a transform block. In this case, the transform block may correspond to the aforementioned transform unit. Accordingly, hereinafter, for convenience of description, a transform kernel, a transform block and a transform unit may also be interchangeably used.

When the video encoder performs transform, it may perform transform on the residual block by applying a transform block corresponding to the size of the residual block or a transform block smaller than the size of the residual block. For example, the video encoder may perform transform by applying one of transform blocks having an 2N×2N size on the residual block if the size of the residual block is 2N×2N, and may perform transform using four transform blocks having an N×N size on the residual block.

The transform block may be a block based on discrete cosine transform (DCT). If the transform block is a block of a specific size, it may be a block based on DST.

Thereafter, the video encoder may perform quantization on the transform coefficient (S820).

As described above, a DCT transform block has very various sizes. That is, a DCT transform block has a variable size structure. Furthermore, the transform block has a partition structure recursively quad-treed from an encoding block (in this case, the encoding block may be the same meaning as the aforementioned coding unit, and an encoding block and a coding unit are hereinafter interchangeably used, for convenience of description). Accordingly, when transform is performed using a DCT transform block, multiplying and addition operation are greatly increased. In particular, when video encoding is performed, rate-distortion optimization is performed in order to obtain the best compression efficiency. Accordingly, motion prediction, motion compensation, DCT transform and entropy encoding are repeatedly performed for each block.

Accordingly, the process of performing transform in the aforementioned video encoding and/or decoding has very great complexity, and thus the delay time of video processing is increased when the video is encoded and decoded due to the aforementioned complexity. Furthermore, lots of costs are consumed because an apparatus for implementing the aforementioned encoding and decoding process in which many pieces of multiplying and addition operation must be performed has very great complexity.

Accordingly, the present invention additionally proposes that a process of performing transforming in an encoding and/or decoding process is divided into a plurality of steps. In this case, in the present invention, a video encoding and/or decoding method of dividing the aforementioned step of performing transform into two steps, for convenience of description, and an apparatus using the same are described.

Figure 9:
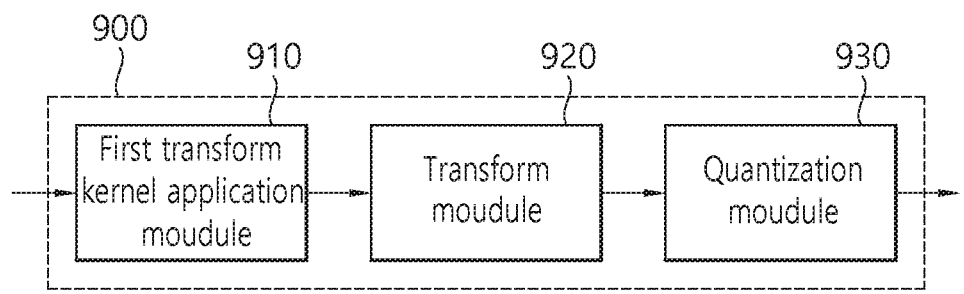
FIG. 9 is a block diagram of a video encoder according to an embodiment of the present invention.

FIG. 9 is a block diagram of a video encoder according to an embodiment of the present invention.

Referring to FIG. 9, the video encoder 900 includes a first transform kernel application unit 910, a transform unit 920 and a quantization unit 930.

The first transform kernel application unit 910 may performs transform based on a first transform kernel. More specifically, the first transform kernel application unit 910 may apply the first transform kernel on a prediction block. Alternatively, the first transform kernel application unit 910 may derive the first transform kernel from the prediction block or the first transform kernel application unit 910 may obtain the results of the application of the first transform kernel from a prediction step. That is, the first transform kernel sets up a correlation with the prediction block. Furthermore, the first transform kernel application unit 910 may derive the first transform kernel based on the size of the prediction block. The first transform kernel may be smaller than or equal to the size of the prediction block. A detailed example of the correlation between the first transform kernel and the prediction block is described later in detail.

Furthermore, the first transform kernel application unit 910 may apply the first transform kernel to an encoding block or encoding unit block. The first transform kernel application unit 910 may derive the first transform kernel from the encoding block (or the encoding unit block, and an encoding unit block and encoding block are hereinafter interchangeably used, for convenience of description). Alternatively, the first transform kernel application unit 910 may obtain the results of the application of the first transform kernel in the prediction step. That is, the first transform kernel establishes a correlation with the encoding block. Furthermore, the first transform kernel application unit 910 may derive the first transform kernel based on the size of the encoding block. The first transform kernel may be smaller than or equal to the size of the encoding block. A detailed example of the correlation between the first transform kernel and the encoding block is described later in detail.

The aforementioned first transform kernel may be used to determine the aforementioned motion vector when prediction encoding is performed. That is, the first transform kernel may be a transform kernel generated in the inter-prediction mode. The first transform kernel may be a kernel used for prediction in the inter-prediction mode. Furthermore, the aforementioned first transform kernel may be a transform kernel generated in the intra-prediction mode when prediction encoding is performed. The first transform kernel may be a kernel used for prediction in the intra-prediction mode.

In this case, the first transform kernel may mean a Walsh-Hadamard transform or kernel or a 2-square transform kernel. The Walsh-Hadamard or 2-square transform has advantages in that it can be easily implemented owing to small computational load and can operate at high speed. Hereinafter, Walsh-Hadamard transform may also be called Walsh transform or Hadamard transform.

An example of the Walsh-Hadamard transform kernel is shown in Equation 1.

$$H_w = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix} \quad \text{[Equation 1]}$$

An example of the 2-square transform kernel is shown in Equation 2.

$$T_{2-p} = \begin{bmatrix} 1 & 1 & 1 & 1 & 1 & 1 & 1 & 1 \\ 2 & 2 & 1 & 2^{-2} & -2^{-2} & -1 & -2 & -2 \\ 2 & 1 & -1 & -2 & -2 & -1 & 1 & 2 \\ 1 & 2^{-2} & -2 & -2 & 2 & 2 & -2^{-2} & -1 \\ 1 & -1 & -1 & 1 & 1 & -1 & -1 & 1 \\ 2 & -2 & -2^{-2} & 1 & -1 & 2^{-2} & 2 & -2 \\ 1 & -2 & 2 & -1 & -1 & 2 & -2 & 1 \\ 2^{-2} & -1 & 2 & -2 & 2 & -2 & 1 & -2^{-2} \end{bmatrix} \quad \text{[Equation 2]}$$

The transform unit 920 may derive a transform coefficient by performing transform based on a second transform kernel. More specifically, the transform unit 920 may additionally apply the second transform kernel to a signal to which the first transform kernel has been applied. In this case, the second transform kernel corresponds to a transform kernel different from the first transform kernel, and the second transform kernel corresponds to a transform kernel having low complexity. That is, the second transform kernel may correspond to a transform kernel designed so that it is implemented using only a shift, addition or subtraction operation for low complexity. The second transform kernel may be expressed as a matrix A having a sparse matrix characteristic. The sparse matrix means a matrix including lots of 0. The sparse matrix may be expressed as a matrix having low complexity as a coefficient that is an integer because it includes lots of 0.

That is, the transform unit 920 may apply the second transform kernel to the results of the application of the first transform kernel. In other words, the transform unit 920 may apply the first transform kernel before the second transform kernel is applied.

For example, the video encoder 900 according to the present invention may perform transform based on the aforementioned Walsh-Hadamard transform kernel and the sparse matrix A. That is, the video encoder according to the present invention may perform conventional DCT transform based on the Walsh-Hadamard transform kernel and the sparse matrix A. In this case, to perform transform based on the Walsh-Hadamard transform kernel and the sparse matrix may be expressed as in Equation 3.

$$C_M = \frac{1}{\sqrt{M}} A_M H_{w,M} \qquad \text{[Equation 3]}$$

In Equation 3, M refers to the size of a matrix, $A_M$ refers to the sparse matrix, $H_{w,M}$ and refers to the aforementioned Walsh-Hadamard matrix. In Equation 3, if $A_8$ is derived and $A_8$ is subjected to an integer, an example of $A_8$ may be expressed as in Equation 4 below.

$$A_8 = \begin{bmatrix} 1 & 0 & 0 & 0 & 0 & 0 & 0 & 0 \\ 0 & 64 & 0 & 32 & 0 & -8 & 0 & 16 \\ 0 & 0 & 12 & 0 & 0 & 0 & 4 & 0 \\ 0 & -32 & 0 & 64 & 0 & 48 & 0 & 24 \\ 0 & 0 & 0 & 0 & 1 & 0 & 0 & 0 \\ 0 & 24 & 0 & -48 & 0 & 64 & 0 & 32 \\ 0 & 0 & -4 & 0 & 0 & 0 & 12 & 0 \\ 0 & -16 & 0 & -8 & 0 & -32 & 0 & 64 \end{bmatrix} \qquad \text{[Equation 4]}$$

Figure 10:
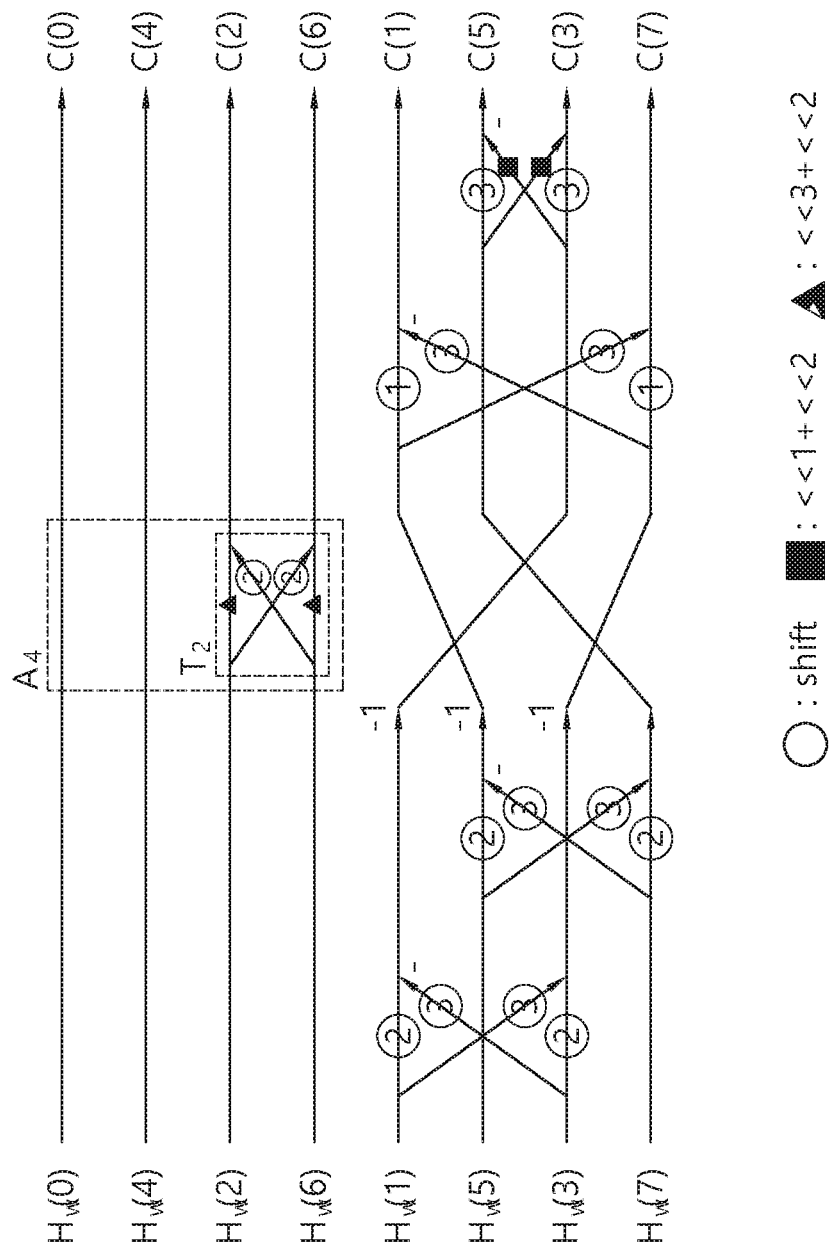
FIG. 10 is an example in which $A_8$, that is, a sparse matrix, is implemented using a butterfly structure and integer coefficients.

If $A_8$, the sparse matrix, is implemented using a butterfly structure and integer coefficients, it results in FIG. 10. FIG. 10 is an example in which $A_8$, the sparse matrix, has been implemented using the butterfly structure and the integer coefficients.

In this case, the $A_8$ matrix operation includes at least one $A_4$ matrix therein. In the example of $A_8$, it is not necessary for each base vector to use a normalized base kernel because the normalization of the base vectors is performed like quantization.

In this case, the aforementioned coefficients may operate as a shift and addition.

Referring back to FIG. 9, for example, the video encoder 900 according to the present invention may perform transform based on the aforementioned 2-square transform kernel and sparse matrix A. That is, the video encoder according to the present invention may perform conventional DCT transform based on the 2-square transform kernel and the sparse matrix A. In this case, to perform transform based on the 2-square transform kernel and the sparse matrix may be expressed as in Equation 5 below.

$$C_M = \frac{1}{\sqrt{M}} A_M T_{2-p,M} \qquad \text{[Equation 5]}$$

In Equation 5, M means the size of a matrix, $A_M$ means the sparse matrix, and $T_{2-p,M}$ means the aforementioned 2-square matrix. In Equation 5, if $A_8$ is derived and $A_8$ is subjected to an integer, an example of $A_8$ may be expressed as in Equation 6 below.

$$A_8 = \begin{bmatrix} 32 & 0 & 0 & 0 & 0 & 0 & 0 & 1 \\ 0 & 32 & 0 & -2 & 0 & 3 & 0 & -1 \\ 0 & 0 & 32 & 0 & 0 & 0 & 2 & 2 \\ 0 & 1 & 0 & 29 & 0 & 13 & 0 & -5 \\ 0 & 0 & 0 & 0 & 32 & 0 & 0 & 1 \\ 0 & -3 & 0 & -13 & 0 & 29 & 0 & -2 \\ 0 & 0 & -2 & 0 & 0 & 0 & 32 & 1 \\ 0 & -1 & 0 & 3 & 0 & 2 & 0 & 31 \end{bmatrix} \qquad \text{[Equation 6]}$$

The aforementioned examples are summarized. The transform unit 920 may apply the Walsh-Hadamard matrix or 2-square matrix before the sparse matrix is applied.

The quantization unit 930 may quantize the received transform coefficient based on a quantization parameter. More specifically, the quantization unit 930 may quantize the received transform coefficient based on a quantization parameter and output the quantized transform coefficient level. That is, the quantization unit 930 may quantize the received transform coefficient using the quantization matrix. In this case, the normalization of the first transform kernel and second transform kernel may be performed like quantization.

In this case, the normalization, quantization and dequantization of an N point Walsh-Hadamard matrix may be expressed as in Equation 7, for example.

$$\hat{F}_q = \text{round}\left(\frac{1}{\|A_i\| \cdot \|A_j\| \cdot N_w q_k} \cdot A_h \cdot H_w \cdot A_v^T\right) \qquad \text{[Equation 7]}$$

$$\hat{H}_r = \text{round}\left(\frac{N_w q_k \cdot (A_h^T \cdot F_q \cdot A_v)}{\|A_i\| \cdot \|A_j\|}\right)$$

For integer operation, the contents of Equation 7 may be expressed as in Equation 8 again.

$$\hat{F}_q = (C \otimes Q_k(i,j) + f \cdot 2^{N_q}) \gg N_q$$

$$\hat{H}_r = (\hat{F}_q \otimes R_k(i,j) + 2^{N_r-1}) \gg N_r \qquad \text{[Equation 8]}$$

In Equation 8, $R_K(i,j)$ and $Q_K(i,j)$ may be expressed as in Equation 9 below.

$$R_k(i,j) = \text{round}\left(\frac{q_k \cdot 2^{N_r}}{N_w \cdot \|A_{ij}\|^2}\right), \qquad \text{[Equation 9]}$$

-continued
$$Q_k(i, j) = \text{round}\left(\frac{2^{N_q+N_r}}{N_w^2 \cdot \|A_{ij}\| \cdot R_k(i, j)}\right)$$

Hereinafter, a detailed example of the correlation between the first transform kernel and the prediction block is described through FIG. 11.

Figure 11:
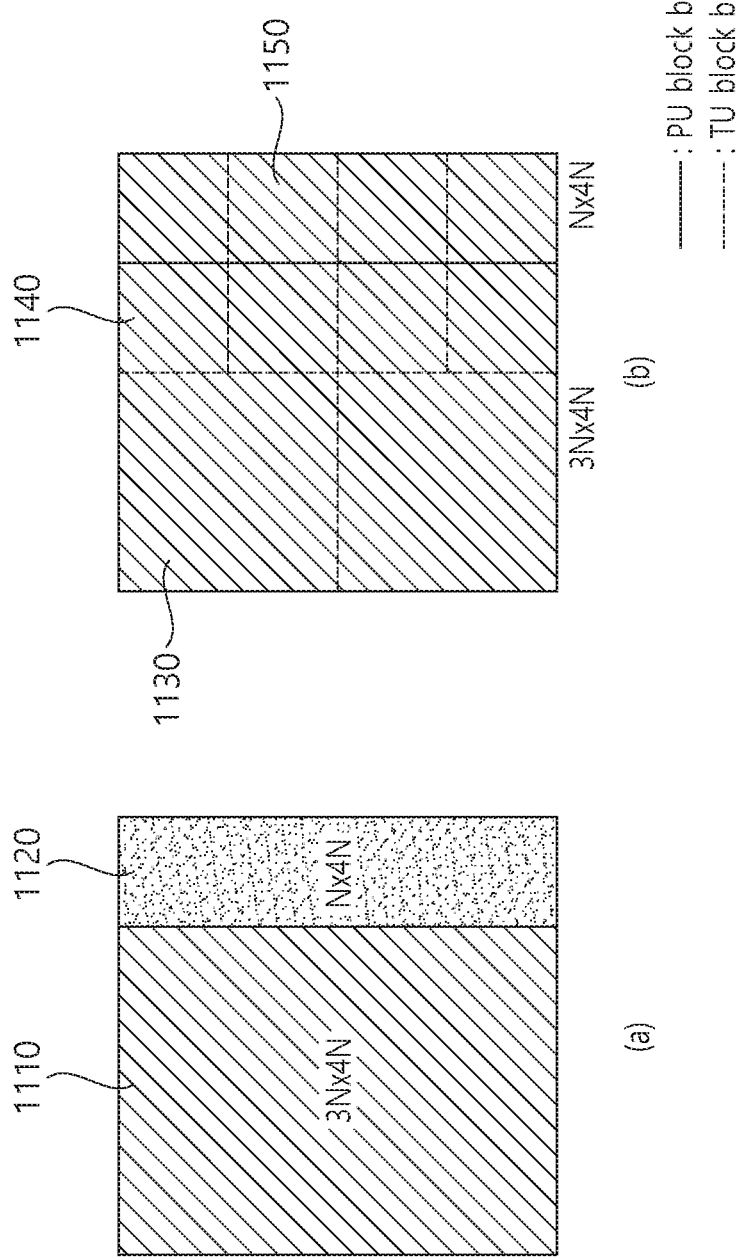
FIG. 11 is a diagram schematically showing a correlation between a prediction block and a transform kernel according to an embodiment of the present invention.

FIG. 11 is a diagram schematically showing the correlation between the prediction block and the transform kernel according to an embodiment of the present invention.

FIG. 11 schematically shows an example of the correlation between the first transform kernel proposed by the present invention and (b) a prediction block 1110 of a 3N×4N size and a prediction block 1120 of an N×4N size if (b) the prediction block 1110 of the 3N×4N size and the prediction block 1120 of the N×4N size are included in an encoding block of a 4N×4N size.

According to the example of FIG. 11, if the prediction block 1110 of the 3N×4N size and the prediction block 1120 of the N×4N size are included in the encoding block of the 4N×4N size, transform may be performed on a residual signal obtained from the 3N×4N prediction block 1110 by applying two transform kernels 1130 of an 2N×2N size and four transform kernels 1140 of an N×N size. Transform may be performed on a residual signal obtained from the N×4N prediction block 1120 by applying four transform kernels 1150 of an N×N size. That is, the two 2N×2N transform kernels 1130 and the four N×N transform kernels 1140 may be included in the prediction block 1110 of the 3N×4N size, and the four N×N transform kernels 1150 may be included in the prediction block 1120 of the N×4N size. In this case, a transform kernel applied in accordance with the size of a prediction block, that is, a transform kernel included in a prediction block, may correspond to the aforementioned first transform kernel. As described above, the first transform kernel may correspond to the Walsh-Hadamard transform kernel or the 2-square transform kernel.

Thereafter, a transform coefficient (e.g., a DCT transform coefficient may be derived by applying a sparse matrix (e.g., by applying the sparse matrix A) of a size corresponding to a transform kernel (e.g., the first transform kernel) applied in accordance with the size of the prediction block.

For example, a transform coefficient may be derived by applying the sparse matrix A, corresponding to the two 2N×2N transform kernels 1130 and the four N×N transform kernels 1140, to the two 2N×2N transform kernels 1130 and the four N×N transform kernels 1140 included in the prediction block 1110 of the 3N×4N size. A transform coefficient may be derived by applying the sparse matrix A, corresponding to the four N×N transform kernels 1150, to the four N×N transform kernels 1150 included in the prediction block 1120 of the N×4N size.

As described above, the transform kernel (e.g., the first transform kernel) may mean a transform block. The transform kernel (e.g., the first transform kernel) may mean a block different from the transform block. That is, the transform kernel (e.g., the first transform kernel) may mean a block generated based on an encoding block and/or a prediction block.

The example of FIG. 11 is differently described below. 1. An encoding block is partitioned into at least one prediction block. 2. The prediction block may include at least one transform kernel. 3. In this case, the transform kernel included in the prediction block has been derived based on the size of the prediction block. 4. A form of the transform kernel included in the prediction block may be a square or a non-square. 5. In this case, as described above, the transform kernel included in the prediction block may be smaller than or equal to the size of the prediction block.

FIG. 11 illustrates an example in which a transform kernel of a square size equal to or smaller than the smaller size of the horizontal-side size and vertical-side size of a prediction block has been applied. However, the present invention is not limited to the example of FIG. 11, and may be applied to a transform kernel of a non-square size, which is equal to or smaller than the size of a prediction block. Furthermore, a combination of a transform kernel of a square and a transform kernel of a non-square may be applied to the prediction block in the present invention.

For example, one transform kernel of an 3N×4N may be applied to the prediction block 1110 of the 3N×4N size. Furthermore, three transform kernels of an 3N×2N size may be applied to the prediction block 1110 of the 3N×4N size. That is, at least one transform kernel equal to or smaller than the size of a prediction block may be applied to the prediction block according to the present invention.

In this case, if the size of the first transform kernel is a maximum of 8×8, examples of encoding blocks, the size of the first transform kernel (specifically, the Walsh-Hadamard transform kernel) and the size of the sparse matrix according to the size of a prediction block are shown in Table 1 and Table 2.

TABLE 1

| Prediction | Size of encoding block | | | |
|---|---|---|---|---|
| block type | 8 × 8 | 16 × 16 | 32 × 32 | 64 × 64 |
| 2N × 2N | $H_8$ | $H_8$ | $H_8$ | $H_8$ |
| N × 2N | $H_4$ | $H_8$ | $H_8$ | $H_8$ |
| N × N | $H_4$ | $H_8$ | $H_8$ | $H_8$ |

Table 1 corresponds to an example in which a maximum size of the Walsh-Hadamard transform kernel is 8×8.

TABLE 2

| Prediction | Size of encoding block | | | |
|---|---|---|---|---|
| block type | 8 × 8 | 16 × 16 | 32 × 32 | 64 × 64 |
| 2N × 2N | $H_8$ | $H_{16}$ | $H_{32}$ | $H_{32}$ |
| N × 2N | $H_4$ | $H_8$ | $H_{16}$ | $H_{32}$ |
| N × N | $H_4$ | $H_8$ | $H_{16}$ | $H_{32}$ |

Table 2 corresponds to an example in which a maximum size of the Walsh-Hadamard transform kernel is 32×32.

Figure 12:
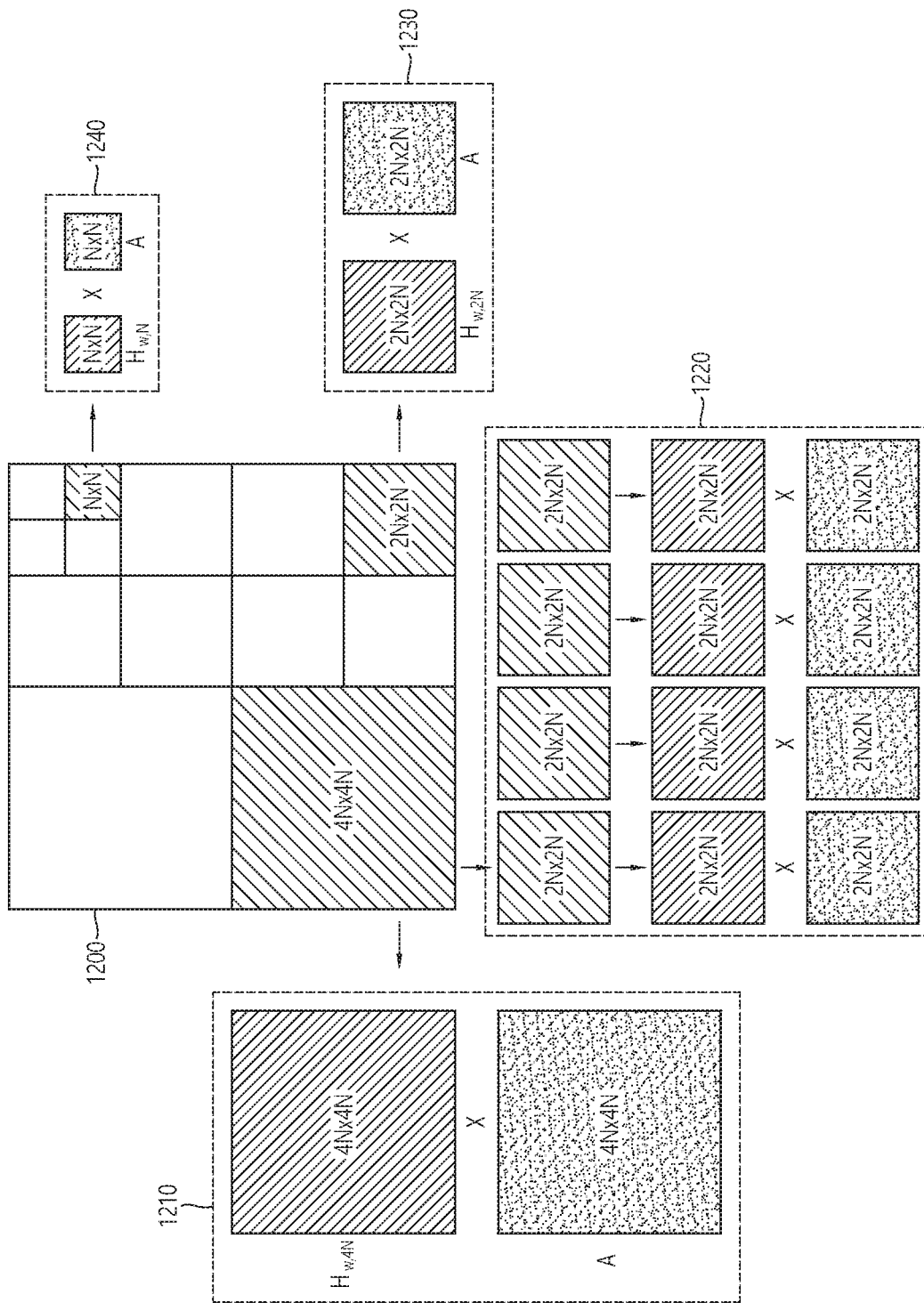
FIG. 12 is a diagram schematically showing a transform kernel applied to a variable partition block according to an embodiment of the present invention.

A detailed example in which the second transform kernel is applied after the aforementioned first transform kernel is applied is described through FIG. 12.

FIG. 12 is a diagram schematically showing a transform kernel applied to a variable partition block according to an embodiment of the present invention.

Referring to FIG. 12, a block 1200 of an 8N×8N size may include blocks of a 4N×4N, 2N×2N and/or N×N size. In this case, the 8N×8N block 1200 may mean a CTU (i.e., LCU) or the 8N×8N block 1200 itself may mean an encoding block.

The 4N×4N block may be included in the 8N×8N block 1200.

In this case, the 4N×4N block may mean an encoding block. The encoding block of the 4N×4N size may be predicted through a prediction block of a 4N×4N size. In this case, the encoder may perform transform based on a 4N×4N first transform kernel and a 4N×4N second transform kernel corresponding to the prediction block of the 4N×4N size (1210).

In this case, the encoding block of the 4N×4N size may include four prediction blocks of a 2N×2N size (i.e., the 2N×2N prediction block is derived from the encoding block of the 4N×4N size). If the size of a prediction block is 2N×2N, the encoder according to the present invention may perform transform based on a first transform kernel and a second transform kernel corresponding to the sizes of respective prediction blocks. That is, transform may be performed on the encoding block of the 4N×4N size using a combination of four 2N×2N first transform kernels and 2N×2N second transform kernels (1220).

A 2N×2N block may be included in the 8N×8N block 1200.

In this case, the 2N×2N block may mean an encoding block. The 2N×2N block may include a 2N×2N prediction block. In this case, the encoder according to the present invention may perform transform using a combination of the first transform kernel of a 2N×2N size and the second transform kernel of a 2N×2N size (1230).

An N×N block may be included in the 8N×8N block 1200.

In this case, the N×N block may mean an encoding block. The N×N block may include an N×N prediction block. In this case, the encoder according to the present invention may perform transform using a combination of the first transform kernel of an N×N size and the second transform kernel of an N×N size (1240).

Figure 13:
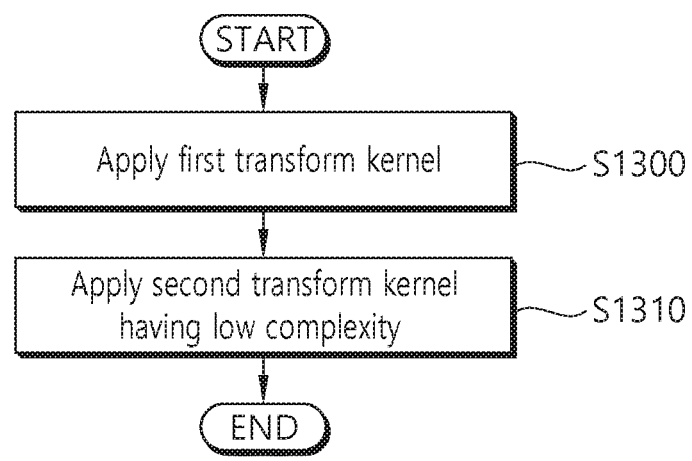
FIG. 13 is a flowchart of a transform method in video encoding according to an embodiment of the present invention.

FIG. 13 is a flowchart of a transform method in video encoding according to an embodiment of the present invention.

Referring to FIG. 13, the video encoder may apply a first transform kernel to a residual signal (S1310). In this case, a detailed example in which the video encoder applies first transform kernel to the residual signal is the same as that described above. That is, the video encoder may apply the first transform kernel to a prediction block. Alternatively, the video encoder may derive the first transform kernel from the prediction block or the video encoder may obtain the results of the application of the first transform kernel in a prediction step. That is, the first transform kernel establishes a correlation with the prediction block. Furthermore, the video encoder may derive the first transform kernel based on the size of the prediction block. The first transform kernel may be smaller than or equal to the size of the prediction block. A detailed example in which the video encoder applies the first transform kernel has been described in detail above, and thus the detailed example in which the video encoder applies the first transform kernel is omitted.

Thereafter, the video encoder applies a second transform kernel to the results of the application of the first transform kernel (S1320). In this case, the second transform kernel may mean a transform kernel having low complexity. A detailed example in which the video encoder applies the second transform kernel is the same as that described above. That is, the video encoder may additionally apply the second transform kernel to a signal to which the first transform kernel has been applied. In this case, the second transform kernel corresponds to a transform kernel different from the first transform kernel, and the second transform kernel corresponds to a transform kernel having low complexity. That is, the second transform kernel may correspond to a transform kernel designed so that it is implemented using only shift, addition or subtraction operation for low complexity. The second transform kernel may be expressed as a matrix A having a sparse matrix characteristic. The sparse matrix means a matrix including lots of 0's. The sparse matrix includes lots of 0's therein, and thus is expressed as a matrix having low complexity as a coefficient subjected to an integer. An example in which the video encoder applies the second transform kernel has been described above, and thus an example in which the video encoder applies the second transform kernel is described below.

Figure 14:
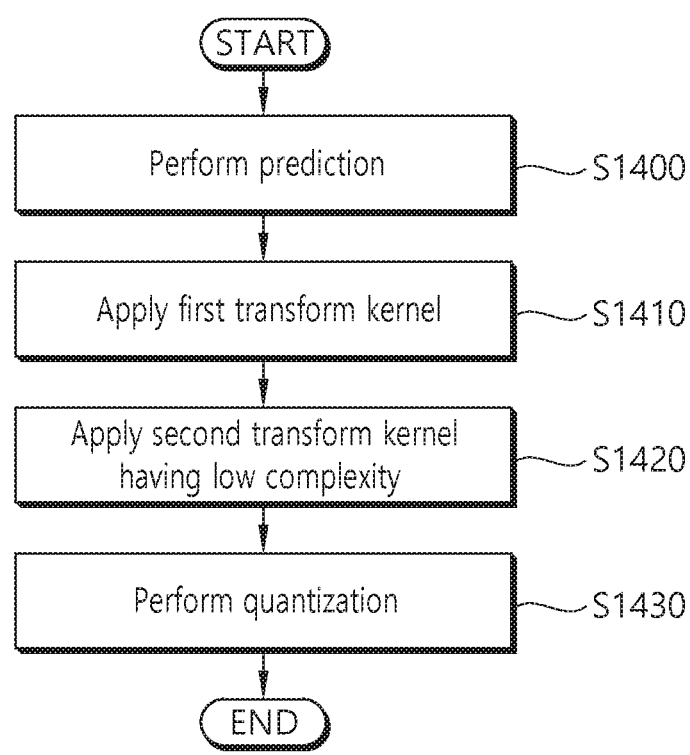
FIG. 14 is a flowchart of a video encoding method according to an embodiment of the present invention.

FIG. 14 is a flowchart of a video encoding method according to an embodiment of the present invention.

Referring to FIG. 14, the video encoder performs prediction (S1400). In this case, a detailed example in which the video encoder performs prediction is the same as that described above.

The video encoder may apply a first transform kernel to a residual block (S1410). In this case, a detailed method of the video encoder applying the first transform kernel to the residual block is the same as that described above.

The video encoder applies a second transform kernel (S1420). More specifically, the video encoder may additionally apply the second transform kernel to the results of the application of the aforementioned first transform kernel. A detailed example in which the video encoder applies the second transform kernel is the same as that described above.

The video encoder may perform quantization on the results of the application of the transform kernel, that is, a transform coefficient (S1430). In this case, a detailed example in which the video encoder performs quantization is the same as that described above.

Figure 15:
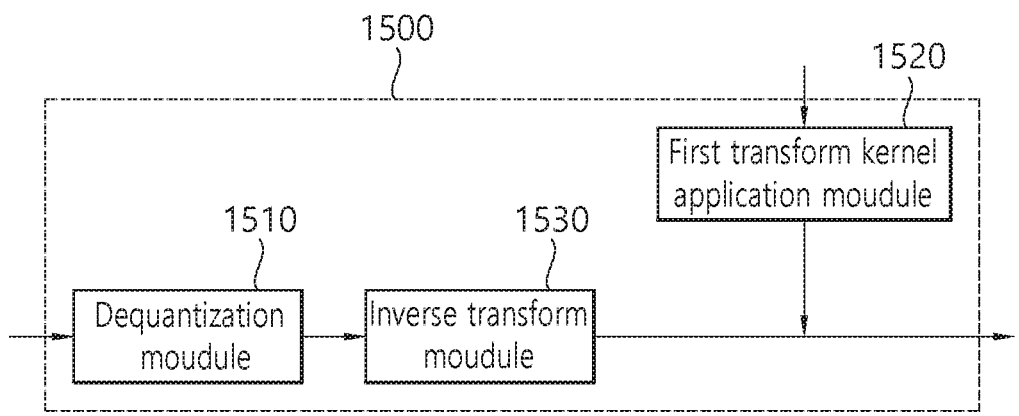
FIG. 15 is a block diagram of a video decoder according to an embodiment of the present invention.

FIG. 15 is a block diagram of a video decoder according to an embodiment of the present invention.

Referring to FIG. 15, the video decoder 1500 may include a dequantization unit 1510, a first transform kernel application unit 1520 and an inverse transform unit 1530.

The dequantization unit 1510 performs dequantization on a quantized residual signal. In this case, a detailed embodiment of the dequantization unit is the same as that described above.

The first transform kernel application unit 1520 may perform transform based on a first transform kernel. In this case, a detailed example in which the first transform kernel is applied is the same as that described above.

The inverse transform unit 1530 may derive a transform coefficient by performing transform based on a second transform kernel. In this case, a detailed example in which inverse transform is performed based on the second transform kernel is the same as that described above. That is, the video decoder according to the present invention may apply the second transform kernel after applying the first transform kernel as described above.

Figure 16:
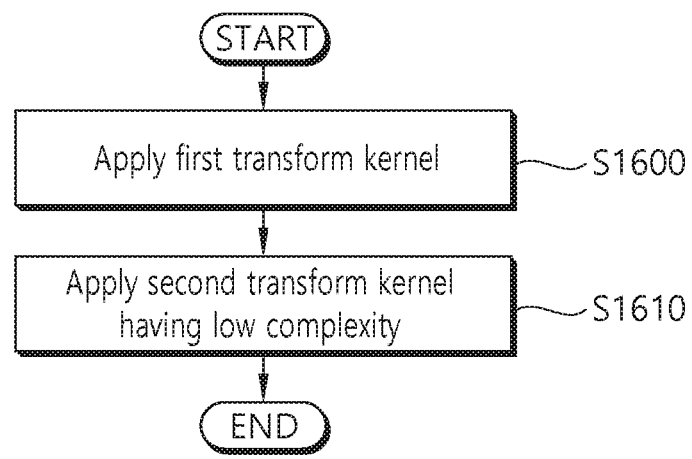
FIG. 16 is a flowchart of a transform method in video decoding according to an embodiment of the present invention.

FIG. 16 is a flowchart of a transform method in video decoding according to an embodiment of the present invention.

Referring to FIG. 16, the video decoder may apply a first transform kernel (S1600). In this case, the detailed contents of the first transform kernel and the detailed contents of the first transform kernel are the same as those described above.

The video decoder may apply a second transform kernel (S1610). In this case, the second transform kernel means a transform kernel having low complexity. The detailed contents of the second transform kernel and detailed contents in which the second transform kernel is applied are the same as those described above.

Figure 17:
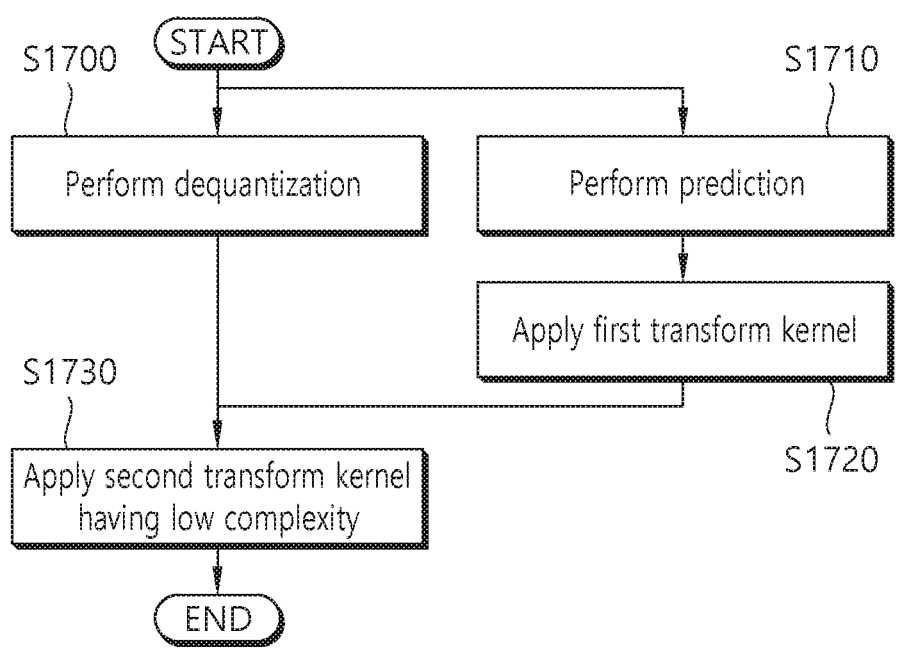
FIG. 17 is a flowchart of a video decoding method according to an embodiment of the present invention.

FIG. 17 is a flowchart of a video decoding method according to an embodiment of the present invention.

Referring to FIG. 17, the video decoder performs dequantization (S1700). A detailed example in which the dequantization is performed is the same as that described above.

The video decoder performs prediction (S1710). In this case, a detailed example in which the video decoder performs the prediction is the same as that described above.

The video decoder additionally applies a first transform kernel (S1720). In this case, a detailed example of the first transform kernel and a detailed example in which the first transform kernel is applied are the same as those described above.

The video decoder applies a second transform kernel (S1730). In this case, the second transform kernel means a transform kernel having low complexity. A detailed example of the second transform kernel and a detailed example in which the second transform kernel is applied are the same as those described above.

For example, in the video decoding method of FIG. 17, 1. Dequantization may be performed on a residual signal, 2. Prediction may be separately performed on video in dequantization, 3. After the first transform kernel is applied based on the prediction, and 4. A second transform kernel may be applied based on the results of the inverse quantization and the results of the application of the first transform kernel.

The contents of FIGS. 9-17 are summarized as follows. As described above, if the size of a prediction block and the size of a transform block are independently determined, there is a limit condition in which the results of Walsh-Hadamard transform used when prediction is performed are used for DCT operation. That is, in determining a motion vector using Walsh-Hadamard transform when motion prediction is performed, there is a limit to obtaining motion prediction having high encoding efficiency due to a difference from DCT due to the Walsh-Hadamard transform.

Accordingly, in the present invention, as described above, in performing transform encoding on an encoding block in video encoding, DCT transform may be partitioned and performed using a Walsh-Hadamard transform or 2-square transform kernel and another transform kernel having a sparse matrix characteristic. DCT operation is performed by applying a transform kernel capable of generating DCT in Walsh-Hadamard transform or 2-square transform information accompanied when motion prediction is performed using a characteristic in which DCT may be performed using a Walsh-Hadamard transform kernel or 2-square transform kernel. Accordingly, a computational load can be significantly reduced compared to a case where DCT transform is directly performed on a prediction residual signal.

Accordingly, the present invention has an advantage of maintaining high encoding efficiency while greatly reducing a high computational load of DCT accompanied when video encoding is performed. DCT can be implemented through Walsh-Hadamard operation, and the Walsh-Hadamard operation is an additional result generated during the encoding process of a prediction step. Accordingly, the present invention has an advantage in that it can generate the same block as the results of DCT with low complexity by multiplying a block on which Walsh-Hadamard operation has been performed by a block of generating DCT.

Furthermore, in the present invention, in a partition encoding/decoding block structure, Walsh-Hadamard transform is used by taking into consideration the size/form of a prediction block, and the results of Walsh-Hadamard transform may be combined with a Walsh-Hadamard transform or 2-square transform kernel in designing a DCT kernel in order to use the results for DCT transform.

Furthermore, in the present invention, motion prediction encoding performance can be improved due to low operation complexity because a 2-square transform kernel is used when motion prediction is performed, and the 2-square transform kernel can be reused when DCT transform is performed.

Accordingly, an encoder/decoder showing high efficiency compression performance in an environment in which resources, such as hardware, are limited can be designed by reducing a high computational load generated due to DCT when video encoding is performed.

In the aforementioned embodiments, although the methods have been described based on the flowcharts in the form of a series of steps or units, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the range of right of the present invention.

The aforementioned embodiments include various aspects of examples. Although all kinds of possible combinations for representing the various aspects may not be described, those skilled in the art will understand that other possible combinations are possible. Accordingly, the present invention should be construed as including all other replacements, modifications, and changes which fall within the scope of the claims.

Furthermore, the aforementioned method according to the present invention may be produced in the form of a program to be executed by a computer and may be stored in a computer-readable recording medium. The computer-readable recording medium may include ROM, RAM, CD-ROM, a magnetic tape, a floppy disk, and an optical data storage device, for example. Furthermore, the computer-readable recording medium includes media implemented in the form of carrier waves (e.g., transmission through the Internet).

Furthermore, the computer-readable recording medium may be distributed to computer systems connected over a network, and computer-readable code may be stored and executed in a distributed manner. Furthermore, a functional program, code and code segments for implementing the method may be easily reasoned by programmers those skilled in the art to which the present invention pertains.

Furthermore, although the preferred embodiments of the present invention have been illustrated and described above, the present invention is not limited to the aforementioned specific embodiments, and a person having ordinary skill in the art to which the present invention pertains may modify the present invention in various ways without departing from the gist of the claims. Such modified embodiments should not be individually interpreted from the technical spirit or prospect of this specification.

What is claimed is:

1. A method for video decoding based on low-complexity transform, the method comprising:
   performing transform on a residual block based on a first transform kernel; and
   performing transform on the transformed residual block based on a second transform kernel having low complexity,
   wherein the first transform kernel is derived based on a prediction block or an encoding unit block, and wherein the first transform kernel is a transform kernel whose element values are powers of two, and the second transform kernel is a sparse matrix.

2. The method of claim 1, wherein the prediction block comprises at least one first transform kernel.

3. The method of claim 2, wherein the prediction block is a square or a non-square.

4. The method of claim 2, wherein the first transform kernel included in the prediction block is a square or a non-square.

5. The method of claim 2, wherein:
the prediction block has a 3N×4N size, and
the prediction block comprises two first transform kernels of a 2N×2N size and four first transform kernels having an N×N size.

6. The method of claim 1, wherein a size of the second transform kernel is identical with a size of the first transform kernel.

7. The method of claim 1, wherein the transform to which both the first transform kernel and the second transform kernel have been applied is a transform corresponding to discrete cosine transform.

8. The method of claim 1, wherein the first transform is based on a Walsh-Hadamard transform kernel, and the first transform and the sparse matrix are defined by the following equation:

$$C_M = \frac{1}{\sqrt{M}} A_M H_{w,M},$$

where $C_M$ corresponds to DCT transform, M is a size of the transform kernel, $A_M$ is the sparse matrix, and $H_{w,M}$ is the Walsh-Hadamard transform kernel.

9. The method of claim 1, wherein:
the first transform kernel is a 2-square transform kernel, and
the second transform kernel is a sparse matrix.

10. The method of claim 9, wherein the transform based on the 2-square transform kernel and the sparse matrix is defined as by the following equation:

$$C_M = \frac{1}{\sqrt{M}} A_M T_{2-p,M},$$

where $C_M$ corresponds to DCT transform, M is a size of the transform kernel, $A_M$ is the sparse matrix, and $T_{2-P,M}$ is the 2-square transform kernel.

11. A method for video encoding based on low-complexity transform, the method comprising:
performing transform on a residual block based on a first transform kernel; and
performing transform on the transformed residual block based on a second transform kernel having low complexity, wherein the first transform kernel is derived based on a prediction block or an encoding unit block, and
wherein the first transform kernel is a transform kernel whose element values are powers of two, and the second transform kernel is a sparse matrix.

12. The method of claim 11, wherein the prediction block comprises at least one first transform kernel.

13. The method of claim 12, wherein the prediction block is a square or a non-square.

14. The method of claim 12, wherein the first transform kernel included in the prediction block is a square or a non-square.

15. The method of claim 12, wherein:
the prediction block has a 3N×4N size, and
the prediction block comprises two first transform kernels of a 2N×2N size and four first transform kernels having an N×N size.

16. The method of claim 11, wherein a size of the second transform kernel is identical with a size of the first transform kernel.

17. The method of claim 11, wherein the transform to which both the first transform kernel and the second transform kernel have been applied is a transform corresponding to discrete cosine transform.

18. A video decoder for performing video decoding based on low-complexity transform, the video decoder comprising a computer readable storage medium storing program instructions that, when executed by a processing device, cause the video decoder to:
transform, with a first transform kernel application module, a residual block based on a first transform kernel; and
transform, with an inverse transform module, the transformed residual block based on a second transform kernel having low complexity,
wherein the first transform kernel is derived based on a prediction block or an encoding unit block, and
wherein the first transform kernel is a transform kernel whose element values are powers of two, and the second transform kernel is a sparse matrix.

19. A video encoder for performing video encoding based on low-complexity transform, the video encoder comprising a computer readable storage medium storing program instructions that, when executed by a processing device, cause the video encoder to:
transform, with a first transform kernel application module, a residual block based on a first transform kernel; and
transform, with a transform module, the transformed residual block based on a second transform kernel having low complexity,
wherein the first transform kernel is derived based on a prediction block or an encoding unit block, and
wherein the first transform kernel is a transform kernel whose element values are powers of two, and the second transform kernel is a sparse matrix.

* * * * *